Aug. 20, 1946.  M. MALLORY  2,406,087
VALVE
Filed June 18, 1942
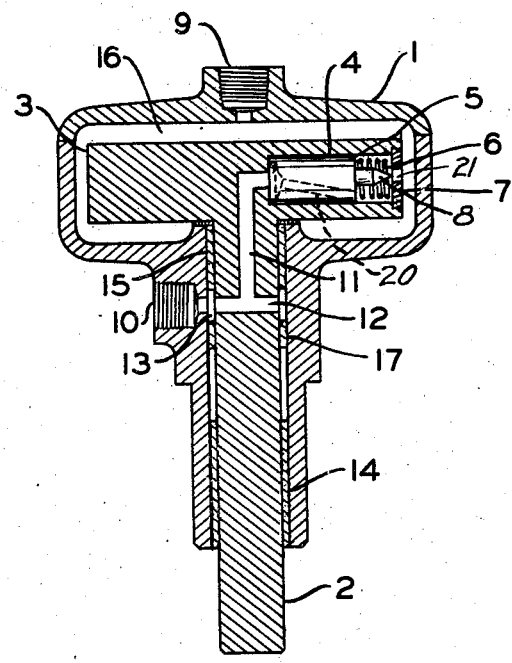
INVENTOR.
MARION MALLORY
BY Barnes, Kisselle Laughlin & Raisch Patented Aug. 20, 1946

2,406,087

UNITED STATES PATENT OFFICE 2,406,087

VALVE

Marion Mallory, Detroit, Mich.

Application June 18, 1942, Serial No. 447,566

2 Claims. (Cl. 137—140)

This invention relates to a valve and more particularly to a centrifugally operated valve for controlling the flow of all types of fluid. The valve is particularly useful for controlling air at sub- and super-atmospheric pressures as well as atmospheric pressure. This valve can be used for many different purposes, for example, for controlling the speed of an internal combustion engine, for controlling electric circuit breakers used in generator circuits that should open and close at certain generator speeds.

The invention contemplates a valve which is admirably adapted for use with an internal combustion engine and is particularly well adapted to be fabricated as a part of the distributor. When the valve is fabricated as a part of the electrical distributor for an internal combustion engine only very minor changes are necessary in the structure of the distributor.

The drawing is a vertical section of the valve. 1 is a stationary valve housing. 2 is a rotary valve shaft. The valve rotor 3 is rigidly connected to the shaft 2. The valve rotor 3 is provided with a cylinder 4 machined or otherwise formed therein. A reciprocable piston 5 is mounted in the cylinder 4 and is backed up by a compression spring 6 which is held in the cylinder 4 by a retainer plate 7 secured in the rotor 3 by a press fit or otherwise. The piston is provided with a needle-type valve 8 at its outer end. The compression spring 6, mounted between the end of the piston 5 and retainer plate 7, continuously urges and normally holds the piston 5 toward the left as viewed in the drawing, that is, in a direction radially inwardly toward the center of rotation of the rotor or towards open position for valve 8, while the position of the center of gravity of the piston between the axis of rotation and the inlet end of the cylinder tends to close the valve during the rotation of the rotor.

The housing 1 is preferably fluid-tight and provided with an inlet 9 and an outlet 10. The rotor shaft 2 is provided with a diametrical passageway 12 therethrough and the shaft housing is provided with a circumferential channel 13 which extends completely around the shaft 2 and continuously communicates with the outlet 10 and with passageway 12. The circumferential opening 13 is defined on the top by the bearing 15 and on the bottom by the bearing 17 for the shaft 2. Shaft 2 is also provided with a bearing 14.

It will be noted that the housing 1 forms a chamber 16 and that the rotor is smaller than the chamber 16 and therefore clears the inside of the housing 1. Chamber 16, if preferred, can be termed the clearance between the rotor 3 and the inside wall of the housing 1. The shaft is provided with a passageway 11 which communicates at one end with the passageway 12 and at the other end with the cylinder 4. The inlet 21 into cylinder 4 is controlled by needle valve 8. Cylinder 4 communicates with the chamber 16 through inlet 21 in the rotor 3. Shaft 2 can be rotated or driven from any suitable source of power.

The operation of the device is as follows: Outlet 10 can be connected to any source of fluid and inlet 9 can be connected to any source of fluid at a pressure greater than that at outlet 10. As the valve shaft 2 and rotor 3 rotate, centrifugal force will tend to shift valve 8 and piston 5 outwardly against the force of spring 6. The speed of the rotor at which valve 8 will close will depend upon several factors, such as the strength of the spring 6 and the weight of the piston 5. It is obvious that piston 5 does not need to have an air-tight fit in cylinder 4 because cylinder 4 opens at both ends into chamber 16. Hence, piston 5 can be mounted loosely in cylinder 4 so that friction between piston 5 and cylinder 4 is minimized.

Once it is determined at what desired speed valve 8 should close, the strength of spring 6 and the weight of piston 5 can be easily determined. As the rotor 3 reaches the predetermined desired speed, the centrifugal force of piston 5 overcomes spring 6 and valve 8 closes. Whenever the speed of rotor 3 falls below a predetermined desired speed, spring 6 opens valve 8.

It is desired that the communication through the valve be open at low speed and close at high speed. The piston 5 is provided with a passageway 20 therethrough which communicates at one end with the passageway 11 and at the other end with cylinder 4. Cylinder 4 communicates with chamber 16 through inlet 21. Spring 6 keeps valve 8 open until a predetermined speed is reached whereupon valve 8 closes inlet 21. Thus valve 8 closes the circuit between inlet 21 and outlet 10 at high speeds. It should be noted that valve 8 closes in a direction opposing the flow of air from inlet 21 toward outlet 10.

This centrifugally operated valve is also admirably suited for use in my engine governor shown in my copending application Serial No. 446,243, filed June 8, 1942.

I claim:

1. In combination, a rotor comprising a shaft having an axial passageway, an outlet in said shaft, a passageway extending from said outlet inwardly into communication with the axial passageway, a cylinder mounted on said shaft and extending transversely of the axis of rotation of the shaft, an inlet into said cylinder, a communication between the said cylinder and the axial passageway in the shaft, a valve controlling said inlet, a piston mounted for reciprocation in said cylinder and carrying said valve, said piston and valve being located between said inlet and the communication between said cylinder and said axial passageway, a passageway establishing communication between opposite ends of the piston, resilient means opposing the closing of said valve, said valve throughout one range of rotational speed of the rotor remaining closed to thereby close the inlet port and throughout another range of rotational speed of said rotor remaining open to thereby permit the air to flow through the inlet, passageway, axial passageway and out of the said outlet, the said valve and piston being centrifugally unbalanced and arranged to close in a direction opposing the flow of air from the inlet to the outlet.

2. In combination, a rotor comprising a shaft having an axial passageway, a housing, spaced bearings for rotatably supporting said shaft in said housing, an outlet in said housing communicating with the space between the spaced bearings, a passageway in said shaft connecting the axial passageway with the space between said bearings, a cylinder mounted on said shaft and extending transversely of the axis of rotation of the shaft, an inlet into said cylinder, a communication between the said cylinder and the axial passageway in the shaft, a valve controlling said inlet, a piston mounted for reciprocation in said cylinder and carrying said valve, said piston and valve being located between said inlet and the communication between said cylinder and said axial passageway, a passageway establishing communication between opposite ends of the piston, resilient means opposing the closing of said valve, said valve throughout one range of rotational speed of the rotor remaining closed to thereby close the inlet port and throughout another range of rotational speed of said rotor remaining open to thereby permit the air to flow through the inlet, passageway, axial passageway and out of the said outlet, the said valve and piston being centrifugally unbalanced and arranged to close in a direction opposing the flow of air from the inlet to the outlet.

MARION MALLORY.